United States Patent Office 3,039,964
Patented June 19, 1962

3,039,964
PREPARATION OF ILMENITE-TYPE COMPOUNDS
Thomas J. Swoboda, Wilmington, Del., assignor to E. I. du Pont de Nemours and Company, Wilmington, Del., a corporation of Delaware
No Drawing. Filed May 6, 1957, Ser. No. 657,052
12 Claims. (Cl. 252—62.5)

This invention relates to ferromagnetic crystalline oxides. More particularly, it relates to an improved process for preparing ferromagnetic cobalt and nickel manganese oxides.

New ferromagnetic crystalline oxides of cobalt and/or nickel and manganese having an ilmenite-type crystal structure have recently been prepared (Toole U.S. Patent 2,770,523 and Swoboda U.S. Patent 2,996,457). These ilmenite-type oxides are useful in many applications, including the magnetic layer in magnetic recording tapes and as coil core materials for use in electronic equipment. However, the methods for preparing these ilmenite-type oxides have required the use of extremely high pressures, i.e., pressures of at least 500 atmospheres. Consequently, heavy reaction vessels capable of withstanding such pressures must be used in the manufacture of these oxides. In view of the utility of these mixed cobalt and/or nickel manganese oxides in various applications, it is a desirable goal to provide new and improved methods for making them, especially methods which do not require the use of high pressures.

An object of the present invention is, accordingly, provision of a novel process for the preparation of ferromagnetic oxides of cobalt and/or nickel and manganese having an ilmenite-type crystal structure.

Another object is provision of a method for preparing the aforesaid ferromagnetic oxides which avoids the use of the high pressures necessary heretofore.

The above-mentioned and yet further objects are achieved in accordance with this invention by a process which comprises heating a mixture of a manganese oxide with nickel and/or cobalt or their oxides at 500° to 800° C. in a molten inorganic composition that promotes fusion of the maganese, nickel, and cobalt reactants, i.e., a flux, preferably a salt, and in the presence of oxygen, the partial pressure of oxygen being at least 50 atmospheres when cobalt is present; solidifying the reaction mixture; and separating from the solidified reaction mixture an ilmenite-type complex oxide of manganese with nickel and/or cobalt.

In a preferred embodiment of the process of this invention, finely divided manganese dioxide and a simple oxide of cobalt or nickel, e.g., cobaltous-cobaltic oxide, $Co_3O_4$, or black nickel oxide, NiO, or a mixture of these oxides, are intimately mixed with a fluxing agent, preferably a salt or salt mixture such as sodium nitrate, lithium fluoride/lithium sulfate, lithium fluoride/sodium fluoride, or manganous sulfate/silver sulfate and the mixture is placed in a corrosion-resistant container, e.g., a container constructed of platinum. This mixture is then heated at a temperature of 500° to 800° C., and preferably 600° to 750° C., in the presence of oxygen. The minimum pressure of oxygen required in any particular case is dependent on the particular oxides being used. When a nickel manganese oxide is being prepared, this pressure can, if desired, be as low as 0.1 atmosphere. However, when the mixed ferromagnetic oxide contains cobalt, it is necessary that a minimum pressure of at least 50 atmospheres be provided in the reaction system. The amount of oxygen required is based on the formula of the ilmenite-type products, i.e., $MMnO_3$, where M is nickel or cobalt. Thus, the minimum amount of oxygen is three atoms for each two atoms of metal, i.e., maganese and cobalt or nickel. The required oxygen can be provided by the decomposition of the oxide reactants used in excess if desired, by decomposition of an ingredient of the flux, or from an external source. The time of heating the reaction mixture at the above-specified reaction temperature is not critical. Reaction times ranging from one to three hours are generally satisfactory, although times are short as one-quarter hour and as long as ten hours can be used if desired.

In another embodiment of the invention, a mixture of finely divided metallic cobalt or nickel, or a mixture of these, and manganous oxide, MnO, can be substituted for the mixture of manganese dioxide with the oxide of cobalt and/or nickel described in the preceding paragraph. This reaction mixture is heated in the same manner as the mixture of the oxides, i.e., at temperatures of 500° to 800° C. in the presence of oxygen, the partial pressure of oxygen being at least 50 atmospheres when cobalt is used.

Many inorganic compounds can be utilized as fluxes in the various embodiments of this invention. Thus the examples below show several specific fluxes including sodium hydroxide, lithium fluoride/sodium fluoride, sodium nitrate, potassium pyrosulfate, aluminum chloride/sodium chloride, and others. Other inorganic compositions having melting points below the operating temperature that promote fusion of the maganese, nickel and/or cobalt reactants can also be employed. The preferred fluxes are solvents for the reactants at the operating temerature. Specific examples of these preferred fluxes include lithium fluoride/sodium fluoride, lithium fluoride/lithium sulfate, lithium fluoride/potassium fluoride, and magnanese sulfate/silver sulfate mixtures. Other fluxes particularly useful by themselves or in combination with other fluxes are those inorganic compounds which liberate oxygen under the reaction conditions. Examples of these include sodium perborate and potassium persulfate. Still other specific inorganic compounds useful as fluxes include sodium tungstate, potassium hydroxide, boric oxide, and lithium nitrate. For ease of separation of the flux from the cobalt manganese oxide or nickel manganese oxide that is formed, it is preferable that the flux be easily soluble in a solvent, e.g., water. For this reason, the water-soluble inorganic compounds are the preferred fluxes for use in this invention.

The quantity of flux employed is not critical. Effects are found in a mixture containing as little as 2% by weight of some of the fluxes (see Example 1 below). Improved results, however, occur with larger quantities. An upper limit on the quantity is set primarily by the difficulties of separating the desired product from increased quantities of flux. Furthermore, an excessive amount of flux would be economically undesirable due to the waste incurred in treatment of unnecessarily large quantities of nonproduct material. The total weight of flux, may, however, be several times that of the reactants, e.g., 3 or 4. Generally a weight ratio of reactants to flux in the range of about 1:1 to 1:2 or 3 will be used.

The ferromagnetic ilmenite-type oxides can be separated from the reaction mixtures obtained as described above by various means. The fluxing agent in the reaction mixture can be removed by washing with a solvent for the flux. For example, when water-soluble fluxing agents are used, water is satisfactory for extracting the flux from the reaction mixture. The ferromagnetic product can be separated from nonmagnetic by-products by physical means. The solid reaction product can be removed from the reaction vessel and ground to a fine powder and this powder then suspended in water. The ferromagnetic portion of the reaction mixture can then be extracted by means of permanent magnets. Alternatively, the crude reaction product can be washed with concentrated inorganic acid, e.g., concentrated nitric acid or cold concentrated hydrochloric acid, to remove nonmagnetic impurities.

While the process of this invention can be carried out at pressures ranging from 1 to 3000 atmospheres or more, a great advantage thereof resides in its operability at pressures below 500 atmospheres. The generally preferred operating pressures are, therefore, 500 atmospheres or lower. The specific pressures preferred in any particular case are dependent on the particular ferromagnetic ilmenite-type oxides being prepared. When nickel manganese oxide is being prepared, it is preferred to operate at atmospheric pressure, with a partial pressure of 0.2 atmosphere of oxygen. However, when cobalt manganese oxide is being prepared, best results are obtained with operating pressures of 200 to 500 atmospheres, with a partial pressure of at least 50 atmospheres of oxygen. When mixed cobalt-nickel manganese oxides are being prepared, the preferred operating pressures lie between the preferred pressures for the individual compounds but with a partial pressure of at least 50 atmospheres of oxygen. The preferred pressure will depend on the particular proportions of the different oxide reactants. Thus, in preparing mixed oxides having the higher proportions of nickel, pressures of 50 to 200 atmospheres are preferred, while in preparing mixed oxides having higher proportions of cobalt, the preferred pressures range from 150 to 500 atmospheres.

As discussed above, the preferred operating pressure for carrying out the process of this invention is 500 atmospheres or less. However, the use of fluxes in the process carried out at pressures above 500 atmospheres results in better yields of higher quality products than are obtained in the prior art methods.

The commercially available cobaltous-cobaltic oxide, $Co_3O_4$, black nickel oxide, $NiO$, and manganese dioxide, $MnO_2$, are suitable starting materials for use in the process of this invention. The black oxide of nickel commercially available contains no metallic nickel and contains a slight excess of oxygen over that theoretically required by the formula $NiO$.

A mixture of metallic nickel and manganous oxide in a finely divided form suitable for use in the alternative process of this invention can be prepared as follows: To an aqueous solution of nickel chloride and manganese chloride heated to boiling is added slowly an aqueous solution of potassium oxalate. After cooling the reaction mixture, the precipitate which forms is filtered, washed with water, and dried. This precipitate is then heated 4 hours at 200° C., ½ hour at 400° C. and ½ hour at 600° C. The product is a finely divided mixture of metallic nickel and manganous oxide.

The proportions of manganese oxide and cobalt, nickel or their oxides used in the process of this invention are not critical since widely varying proportions of the two reactants give the desired ferromagnetic ilmenite-type oxides. Reaction mixtures of group VIII metal oxide and manganese dioxide which are operable include those having an atomic ratio of group VIII metal to manganese ranging from 2:1 to 1:4. With atomic ratios other than 1:1, larger proportions of undesired nonmagnetic by-products are produced. However, when an excess of manganese dioxide is used, it is easier to isolate magnetic cobalt (or nickel) manganese oxides of higher purity. In the preparation of ferromagnetic cobalt manganese oxide, the preferred molar ratio of reactants is one mole of cobaltous-cobaltic oxide to three moles of manganese dioxide. On the other hand, the preferred molar ratio of black nickel oxide to manganese dioxide is 1:1.

Mixed cobalt-nickel manganese oxides which are ferromagnetic, have the ilmenite-type structure, and have the formula $Co_xNi_{1-x}MnO_3$, where $x$ is between 0.01 and 0.99, can also be prepared by using a mixture of cobalt and nickel oxides with manganese dioxide. In this modification the mole ratios of the three oxide reactants can be varied over wide limits. It is essential that the manganese dioxide amount to between 15 and 85 mole percent of the total oxide mixture (mole percent calculated using the molecular weights of nickel oxide and manganese dioxide and one third the molecular weight of cobaltous-cobaltic oxide). The amount of manganese dioxide used strongly influences the yield of the magnetic phase obtained. The preferred range is between 50 and 75 mole percent of manganese dioxide. The proportions of the cobaltous-cobaltic oxide and nickel oxide can vary widely, amounts of either nickel oxide or cobaltous-cobaltic oxide as low as 0.01 mole percent being operable. The chemical composition and physical properties of the magnetic phase obtained under a given set of operating conditions are controlled to a great extent by the relative proportions of cobaltous-cobaltic oxide and nickel oxide in the reaction mixture.

The process of this invention is illustrated in further detail in the following examples in which the proportions of ingredients are expressed in parts by weight unless otherwise specified.

EXAMPLE 1

An intimate mixture of 2.40 parts of nickel oxide and 5.60 parts of manganese dioxide is prepared by grinding the ingredients together in an agate mortar. A portion of this mixture (5.20 parts) is placed on a fritted glass funnel, and a sufficient quantity of 25% aqueous sodium hydroxide solution to thoroughly wet the mixture is filtered through. The solid mixture retains about 10% by weight of solution or 2.5% by weight of sodium hydroxide under these conditions. The wet mixture is placed in an oven at 110° C. for 5 to 8 minutes to partially dry it. A portion of the damp mixture (3.26 parts) is placed in a platinum tube which is closed by crimping but not sealed. The tube is placed in a furnace which is then heated to 700° C. at 1 atmosphere pressure and held at this temperature for 2 hours. The partial pressure of oxygen present during the reaction is between 0.2 and 1 atmosphere. The tube is allowed to remain in the furnace during cooling overnight. The product isolated from the tube is a brown-tan solid sintered into moderately hard pieces which contain magnetic material. X-ray analysis of this product reveals the three strongest lines of the ilmenite-type oxide, $NiMnO_3$, plus a number of other lines which could also belong to the ilmenite-type pattern. Strong patterns for $Mn_2O_3$ and $NiO$ were also present, together with a few unidentified lines.

EXAMPLE 2

(a) A platinum tube charged with 0.15 part of nickel oxide, 0.35 part of manganese dioxide, 0.21 part of lithium fluoride and 0.34 part of sodium fluoride is heated at 725° C. for 3–4 hours as described in Example 1. There is recovered 0.45 part of a light gray, moderately magnetic solid after extraction of the fluoride with boiling water. The Curie temperature of this product is found to be 157° C. and X-ray analysis reveals the presence of the strong ilmenite-type pattern of $NiMnO_3$.

(b) A larger amount of nickel manganese oxide is prepared as described in Example 2(a) with the exception that the heating period is extended to 5–6 hours. Nine parts of this product is treated with cold concentrated hydrochloric acid for 40 minutes and with hot concentrated nitric acid for 20 minutes. The residue recovered from these treatments amounts to 4.64 parts and has a Curie temperature of 153° C. X-ray analysis reveals a very strong ilmenite-type pattern. There is also a very weak, unidentified pattern. The magnetic properties of this product are as follows:

Saturation induction, $B_s$=1690 gauss; and
Intrinsic coercive force, $H_{ci}$=129 oersteds.

EXAMPLES 3–6

Mixtures of 0.75 part of black nickel oxide, 1.74 parts of manganese dioxide and the amount of fluxing agents specified in Table I are placed in flexible platinum tubes which are then closed by crimping, but are not sealed. The charged tubes are placed in a pressure vessel and heated at 600° C. under 200–220 atmospheres' oxygen pressure for 3 hours. After cooling, the reaction products are removed from the platinum tube and suspended in water. The magnetic material is withdrawn with a strong magnet. Further purification is achieved by shaking the dried product in a magnetic field. X-ray patterns of each product show that the magnetic nickel manganese oxide has the ilmenite-type crystal structure. Other properties of the products of each example are listed in Table I.

Table I

Ferromagnetic Ilmenite-type Nickel Manganese Oxides

| Example No. | Fluxing Agent(s) Used (parts by weight) | Properties of Products | |
|---|---|---|---|
| | | Color | Curie Temperature °C. |
| 3 | NaNO$_3$ (3.18) | Gray | 166 |
| 4 | K$_2$S$_2$O$_7$ (6.35) | Dark gray | 165 |
| 5 | {AlCl$_3$ (3.34), NaCl (1.46)} | Gray | 160 |
| 6 | {BaF$_2$ (1.05), CaF$_2$ (0.35), LiF (0.46), MgF$_2$ (0.63)} | Black | 164 |

EXAMPLE 7

A mixture of 0.29 part of cobaltous-cobaltic oxide, 0.14 part of black nickel oxide, 0.53 part of manganese dioxide, 0.44 part of lithium fluoride, and 2.48 parts of lithium sulfate is placed in a platinum tube, the top end of which is left open. The tube is then placed in a steel bomb and heated at 600° C. for 3 hours under an oxygen pressure of 100 atmospheres. After cooling to room temperature, the bomb is opened and a porous sintered gray-black product is removed from the reaction tube. This product is ground and extracted with large volumes of cold, then hot water. On filtration and washing with acetone, followed by air drying, there is obtained 0.88 part of finely divided gray-black magnetic residue. This residue is separated magnetically and there is isolated 0.22 part of a magnetic fraction. The Curie temperature of this fraction is found to be 132° C. This value of the Curie temperature, and the shape of the Curie temperature curve, show the product to be a mixed cobalt-nickel manganese oxide.

EXAMPLES 8–9

Flexible platinum tubes are charged with 1.81 parts of cobaltous-cobaltic oxide, 1.96 parts of manganese dioxide, and the specified amounts of fluxing agents listed in Table II, and the tubes heated and products worked up as in Examples 3–6. The resulting products are cobalt manganese oxides having the ilmenite-type crystal structure as shown by X-ray analysis. Other properties of the products are listed in Table II.

Table II

Ferromagnetic Ilmenite-type Cobalt Manganese Oxides

| Example No. | Fluxing Agent(s) Used (parts by weight) | Properties of Products | |
|---|---|---|---|
| | | Color | Curie Temperature °C. |
| 8 | K$_2$S$_2$O$_7$ (4.76) | Black | 125 |
| 9 | AlCl$_3$ (2.5), NaCl (1.1) | Dark gray | 107 |

EXAMPLE 10

A mixture of 0.61 part of Co$_3$O$_4$, 0.66 part of MnO$_2$, 0.38 part of MnSO$_4$, and 2.36 parts of Ag$_2$SO$_4$ is charged to a platinum tube which is closed by crimping but not sealing. The tube is placed in a steel bomb and heated to 700° C. for 3 hours under a bomb pressure of 200 atmospheres of oxygen. The bomb is cooled rapidly in a stream of cold air. The tube contents are extracted with hot water until all soluble materials are dissolved. A black residue remains from which 0.97 part of a strongly magnetic powder is magnetically isolated. A Curie temperature of 117° C., corresponding to that of CoMnO$_3$ is obtained for this product.

As indicated hereinbefore, the use of fluxing agents in the manufacture of magnetic cobalt and/or nickel manganese oxides having an ilmenite-type crystal structure enables the process to be carried out at lower pressures than the hitherto known methods, e.g., at pressures below 500 atmospheres. However, higher operating pressures can be employed with these fluxes, and in this case the use of the flux results in better yields of higher quality product than are obtained without such fluxes. This aspect of the process is illustrated by Examples 11 to 14.

EXAMPLE 11

A mixture of 0.15 part of black nickel oxide, 0.35 part of manganese dioxide and 0.50 part of boric acid is placed in a flexible platinum tube. The tube is sealed, placed in a pressure vessel and pressure applied by introduction of sufficient water to produce a pressure of 3000 atmospheres at the operating temperature of 700° C. The vessel is then heated at 700° C. for 3 hours. The assembly is then cooled, the pressure vented, and the platinum tube removed. The product in the tube is thoroughly washed with boiling water to remove the fluxing agents. The residue is suspended in water and separated into magnetic and nonmagnetic fractions by agitation in the presence of a strong magnetic field (about 3000 gauss). There is thus obtained 0.48 part of a crystalline, gray, magnetic solid, together with a finely divided brown dust. The Curie temperature of the gray solid is 169° C. and X-ray analysis reveals a strong ilmenite-type pattern of NiMnO$_3$. The X-ray analysis also shows a weak manganese dioxide pattern and several weak unidentified lines.

EXAMPLE 12

A mixture of 0.06 part of black nickel oxide, 0.11 part of manganese dioxide and 0.33 part of sodium tetraborate is heated at 700° C. under 3000 atmospheres' pressure for 3 hours in a sealed platinum tube as described in Example 11. After extraction of the crude product with boiling water, there is isolated 0.17 part of black, finely divided solid. This product is then extracted for 3 minutes with cold concentrated hydrochloric acid. The residue from the acid extraction is a black magnetic solid amounting to 0.05 part. X-ray analysis of this residue reveals a moderately weak ilmenite-type pattern of NiMnO$_3$, together with a strong nickel oxide pattern and an extensive set of weak unidentified lines.

EXAMPLE 13

A reaction mixture comprising 0.48 part of cobaltous-cobaltic oxide, 0.52 part of manganese dioxide, 0.15 part of lithium fluoride, and 0.83 part of lithium sulfate is placed in an open platinum tube which is then inserted in a pressure vessel as in Example 11. Oxygen is introduced into the vessel in sufficient amount to give a pressure of 900 atmospheres at 600° C. and these conditions are maintained for 3 hours. The product, a dark gray, strongly magnetic solid possessing a Curie temperature of 116° C., is CoMnO$_3$.

EXAMPLE 14

A mixture of 1.81 parts of cobaltous-cobaltic oxide, 1.96 parts of manganese dioxide, and 6.8 parts of potassium acid sulfate is heated in a flexible platinum tube at 700° C. and 3000 atmospheres' pressure for 3 hours as in Example 11. After washing in hot water and magnetic separation there is obtained 0.34 part of a microcrystalline magnetic solid, CoMnO$_3$.

The ferromagnetic cobalt and/or nickel manganese oxides prepared by this invention are useful in the many applications in which magnetic oxides are normally employed. For example, they are useful as the magnetic coatings of magnetic recording tapes and as magnetic core materials, such as coil core materials for use in electronic equipment.

Since obvious modifications in the invention will occur to those skilled in the chemical arts, I propose to be bound solely by the appended claims.

The embodiments of the invention in which an exclusive property or privilege is claimed are defined as follows:

1. The process for preparing a ferromagnetic crystalline complex oxide of manganese and at least one member of the group consisting of nickel and cobalt, said oxide having an ilmenite-type crystal structure, which comprises heating a mixture of a manganese oxide with at least one member of the group consisting of nickel and cobalt oxides and metallic nickel and metallic cobalt, manganese dioxide to the extent of 15–85 mole percent of the mixture being employed when both nickel and cobalt oxides are present, at about 500–800° C in the presence of (1) oxygen, the partial pressure of which is at least 50 atmospheres when cobalt is among the reactants, and (2) at least about 2% by weight of a molten inorganic flux that melts below the reaction temperature and promotes fusion of the reactants, said inorganic flux being selected from the group consisting of boric acid, boric oxide, alkali metal hydroxides, and alkali metal, silver, barium and aluminum fluorides, chlorides, sulfates, bisulphates, pyrosulfates, persulfates, perborates, tetraborates, nitrates and tungstates and mixtures thereof, the total pressure on the reactants being not greater than about 500 atmospheres.

2. The process for preparing a ferromagnetic crystalline complex oxide of manganese and nickel having an ilmenite-type crystal structure which comprises heating a comminuted mixture of manganese dioxide and a nickel oxide at a temperature of about 500–800° C. in the presence of (1) oxygen and (2) at least about 2% by weight of a molten inorganic flux that melts below the reaction temperature and promotes fusion of the reactants, said inorganic flux being selected from the group consisting of boric acid, boric oxide, alkali metal hydroxides, and alkali metal, silver, barium and aluminum fluorides, chlorides, sulfates, bisulphates, pyrosulfates, persulfates, perborates, tetraborates, nitrates and tungstates and mixtures thereof, the total pressure on the reactants being not greater than about 500 atmospheres.

3. The process of claim 2 wherein the inorganic flux is a mixture of sodium and lithium fluorides.

4. The process of claim 2 wherein the inorganic flux is a mixture of aluminum and sodium chlorides.

5. The process of claim 2 wherein the flux is a mixture of barium and lithium fluorides.

6. The process for preparing a ferromagnetic crystalline complex oxide of manganese and nickel having an ilmenite-type crystal structure which comprises heating a comminuted mixture of manganous oxide and nickel at a temperature of about 500–800° C. in the presence of (1) oxygen and (2) at least about 2% by weight of a molten inorganic flux that melts below the reaction temperature and promotes fusion of the reactants, said inorganic flux being selected from the group consisting of boric acid, boric oxide, alkali metal hydroxides, and alkali metal, silver, barium and aluminum fluorides, chlorides, sulfates, bisulphates, pyrosulfates, persulfates, perborates, tetraborates, nitrates and tungstates and mixtures thereof, the total pressure on the reactants being not greater than about 500 atmospheres.

7. The process for preparing a ferromagnetic crystalline complex oxide of manganese and cobalt having an ilmenite-type crystal structure which comprises heating a comminuted mixture of manganese dioxide and a cobalt oxide at a temperature of about 500–800° C. and in the presence of (1) oxygen at a partial pressure of at least 50 atmospheres, and (2) at least about 2% by weight of molten inorganic flux that melts below the reaction temperature and promotes fusion of the reactants, said inorganic flux being selected from the group consisting of boric acid, boric oxide, alkali metal hydroxides, and alkali metal, silver, barium, and aluminum fluorides, chlorides, sulfates, bisulphates, pyrosulfates, persulfates, perborates, tetraborates, nitrates and tungstates and mixtures thereof, the total pressure on the reactants being not greater than about 500 atmospheres.

8. The process of claim 7 wherein the inorganic flux is a mixture of lithium fluoride and lithium sulfate.

9. The process of claim 7 wherein the inorganic flux is potassium acid sulfate.

10. The process for preparing a ferromagnetic crystalline complex oxide of manganese and cobalt having an ilmenite-type crystal structure which comprises heating a comminuted mixture of manganous oxide and metallic cobalt, at a temperature of about 500–800° C. and in the presence of (1) oxygen at a partial pressure of at least 50 atmospheres and (2) at least about 2% by weight of a molten inorganic flux that melts below the reaction temperature and promotes fusion of the reactants, said inorganic flux being selected from the group consisting of boric acid, boric oxide, alkali metal hydroxides, and alkali metal, silver, barium and aluminum fluorides, chlorides, sulfates, bisulphates, pyrosulfates, persulfates, perborates, tetraborates, nitrates and tungstates and mixtures thereof, the total pressure on the reactants being not greater than about 500 atmospheres.

11. The process for preparing a ferromagnetic crystalline complex oxide of manganese, cobalt and nickel having an ilmenite-type crystal structure which comprises heating a comminuted mixture of manganese dioxide, nickel oxide and cobalt oxide in which the manganese dioxide constitutes about 15–85 mole percent at a temperature of about 500–800° C. and in the presence of (1) oxygen at a partial pressure of at least 50 atmospheres and (2) at least about 2% by weight of a molten inorganic flux that melts below the reaction temperature and promotes fusion of the reactants, said inorganic flux being selected from the group consisting of boric acid, boric oxide, alkali metal hydroxides, and alkali metal, silver, barium and aluminum fluorides, chlorides, sulfates, bisulphates, pyrosulfates, persulfates, perborates, tetraborates, nitrates and tungstates and mixtures thereof, the total pressure on the reactancts being not greater than about 500 atmospheres.

12. The process for preparing a ferromagnetic crystalline complex oxide of manganese, cobalt and nickel having an ilmenite-type crystal structure which comprises heating a comminuted mixture of manganous oxide, metallic nickel and metallic cobalt in which manganous oxide constitutes about 15–85 mole percent at a temperature of about 500–800° C. and in the presence of (1) oxygen at a partial pressure of at least 50 atmospheres, and (2) at least about 2% by weight of a molten inorganic flux that melts below the reaction temperature and promotes fusion of the reactants, said inorganic flux being selected from the group consisting of boric acid, boric oxide, alkali metal hydroxides, and alkali metal, silver, barium and aluminum fluorides, chlorides, sulfates, bisulphates, pyrosulfates, persulfates, perborates, tetraborates, nitrates and tungstates and mixtures thereof, the total pressure on the reactants being not greater than about 500 atmospheres.

References Cited in the file of this patent

UNITED STATES PATENTS

| | | |
|---|---|---|
| 1,976,230 | Kato et al. | Oct. 9, 1934 |
| 1,997,193 | Kato et al. | Apr. 9, 1935 |
| 2,283,250 | Goldschmidt | May 19, 1942 |
| 2,547,406 | Morin | Apr. 3, 1951 |

(Other references on following page)

UNITED STATES PATENTS

| | | |
|---|---|---|
| 2,565,111 | Albers-Schoenberg | Aug. 21, 1951 |
| 2,626,111 | Albers-Schoenberg | Jan. 27, 1953 |
| 2,700,023 | Albers-Schoenberg | Jan. 18, 1955 |
| 2,703,354 | Wainer | Mar. 1, 1955 |
| 2,705,701 | Crowley | Apr. 5, 1955 |
| 2,723,239 | Harvey | Nov. 8, 1955 |
| 2,736,708 | Crowley et al. | Feb. 28, 1956 |
| 2,770,523 | Toole | Nov. 19, 1956 |
| 2,773,039 | Albers-Schoenberg | Dec. 4, 1956 |
| 2,848,310 | Remeika | Aug. 19, 1958 |

FOREIGN PATENTS

| | | |
|---|---|---|
| 524,097 | Belgium | Nov. 30, 1953 |
| 644,639 | Great Britain | Oct. 18, 1950 |
| 739,069 | Great Britain | Oct. 26, 1955 |
| 740,894 | Great Britain | Nov. 23, 1955 |
| 763,809 | Great Britain | Dec. 19, 1956 |